United States Patent [19]
Porozni

[11] Patent Number: 5,980,835
[45] Date of Patent: Nov. 9, 1999

[54] AMBIENT AIR INLET ASSEMBLY FOR A HAZARDOUS GAS MIXING APPARATUS

[75] Inventor: Gordon B. Porozni, Portland, Oreg.

[73] Assignee: Innovative Engineering Solutions, Inc., Chandler, Ariz.

[21] Appl. No.: 09/002,427

[22] Filed: Jan. 2, 1998

[51] Int. Cl.$^6$ ................................................. G05D 7/00
[52] U.S. Cl. ........................... 422/111; 422/110; 422/120; 422/168; 422/176; 422/172
[58] Field of Search ................. 422/4, 110, 111, 422/120, 168, 176, 172; 137/3, 100; 72/861.66

[56] References Cited

U.S. PATENT DOCUMENTS

| | | | |
|---|---|---|---|
| 3,748,901 | 7/1973 | DeBaun | 73/861.66 |
| 4,297,900 | 11/1981 | Brandt | 73/861.66 |
| 5,234,672 | 8/1993 | Ruscheweyh | 423/243.08 |
| 5,353,829 | 10/1994 | Shiban | 137/88 |

*Primary Examiner*—Hien Tran
*Assistant Examiner*—James Kennedy
*Attorney, Agent, or Firm*—James D. Givnan, Jr.

[57] ABSTRACT

A hazardous gas mixing apparatus includes a mixing chamber wherein air is mixed with such a gas to render same inert. An air inlet assembly admits an air flow induced into the mixing chamber and includes an air flow sensor having a probe located in a housing of the assembly. Differential air pressures detected by the probe are provided to a signal generating transmitter and signal converter serving a logic controller providing a display correlated to linear feet per minute air flow in the apparatus mixing chamber. A honeycomb air straightener serves to provide a laminar flow of air past the sensor probe. An intake screen on the housing reduces the intake of foreign particles.

5 Claims, 1 Drawing Sheet

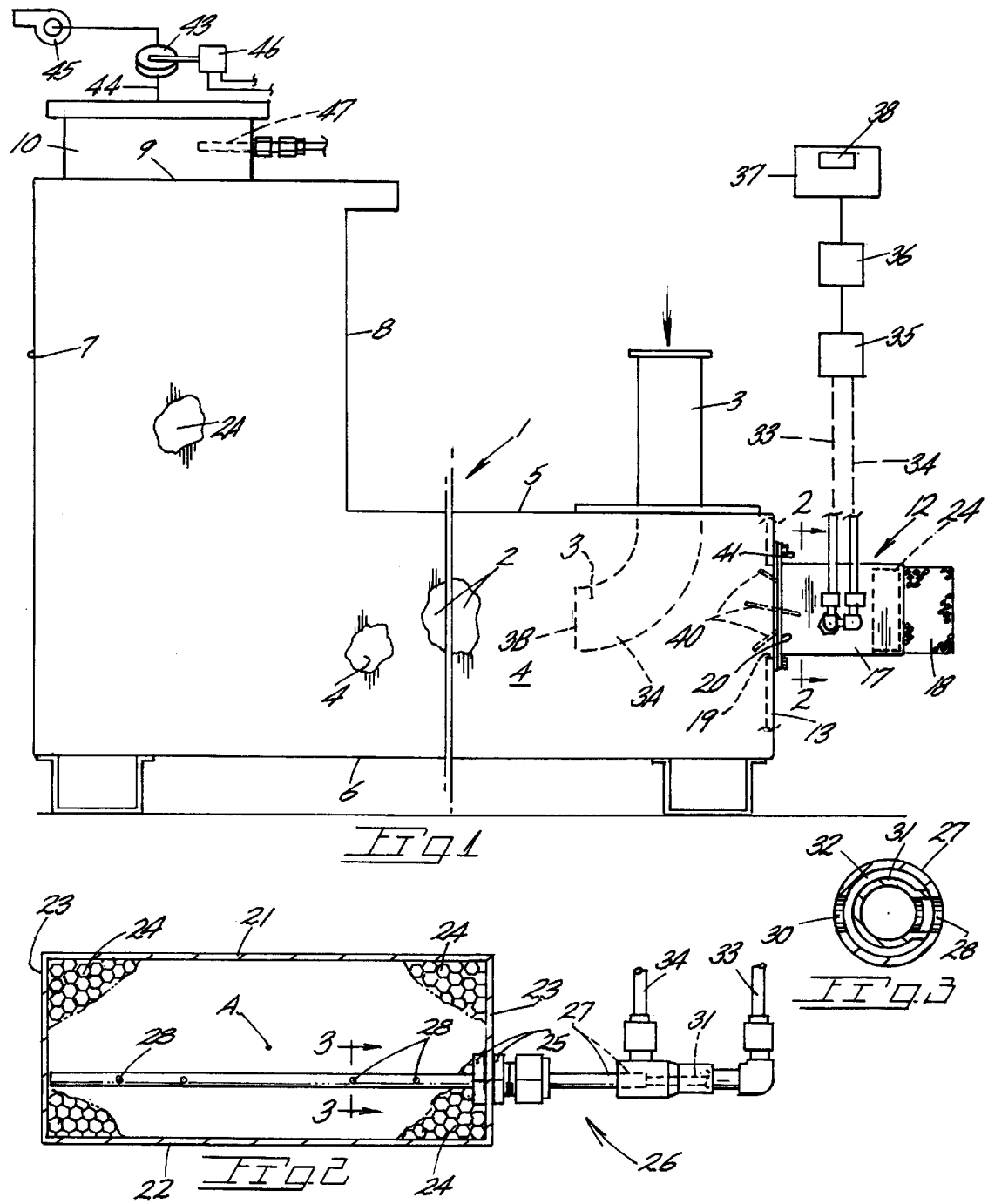

AMBIENT AIR INLET ASSEMBLY FOR A HAZARDOUS GAS MIXING APPARATUS

BACKGROUND OF THE INVENTION

The present invention is directed toward ensuring adequate air flow through an apparatus for mixing air with a hazardous gas from industrial operations to render the latter inert permitting release to the atmosphere.

A mixing apparatus of the type described in U.S. Pat. No. 5,353,829, incorporated herein by reference, serves to mix an incoming flow of ambient air with a flow of hazardous gas discharged into a mixing chamber of the apparatus. It has been determined that air flow through the mixing chamber of the apparatus be determined at the apparatus air inlet and that a flow rate be continuously displayed to enable monitoring.

In the equipment field for determining air flows through conduits are sensors having a probe for installation in an air conduit and which include high and low pressure ports for the determining air velocity. Pitot tubes of the type having a single inlet port directed toward incoming air have proved inadequate for use with hazardous gas mixing apparatuses wherein a change in air flow rate could be critical.

SUMMARY OF THE PRESENT INVENTION

The present invention is embodied in assembly of components serving to provide a precise readout of the flow rate of air entering and moving through a hazardous gas mixing apparatus.

A flow sensor is presently utilized having multiple pitot tubes responsive to high and low pressures in an air inlet with high pressure sensed in a series of ports facing upstream in the air flow and low pressure ports directed toward the opposite or downstream direction. An air straightener is located upstream from the flow sensor to reduce turbulence and inaccurate readings.

Coupled to the flow sensor is a differential pressure transmitter which provides a signal to a converter with a digital output for processing by a programmable logic controller termed a PLC to provide a digital display of air flow velocity. Air entering the mixing chamber is acted upon by a diffuser with fins directing portions of the income air along inclined vectors.

Important objectives of the present invention include the provision of an air inlet assembly providing a readout correlated to air velocity within a mixing chamber wherein a hazardous gas is being mixed with air to render the gas inert for atmosphere discharge; the provision of an air inlet assembly for a hazardous gas mixing apparatus wherein the incoming ambient air is acted on by a straightener to reduce turbulence at a point upstream from a flow sensor of the assembly; the provision of an air inlet assembly that conditions inlet air flow for passage in laminar fashion past a flow sensor and subsequently diverts portions of the air flow toward different internal areas of a mixing chamber of an apparatus for mixing air with a hazardous gas.

BRIEF DESCRIPTION OF THE DRAWINGS

In the accompanying drawings:

FIG. 1 is a side elevational view of a hazardous gas mixing apparatus;

FIG. 2 is a vertical sectional view taken along line 2—2 of FIG. 1; and

FIG. 3 is a vertical sectional view taken along line 3—3 of FIG. 2.

DETAILED DESCRIPTION OF THE PREFERRED EMBODIMENTS

With continuing attention to the drawings, wherein applied reference numerals indicate parts similarly hereinafter identified, the reference numeral 1 indicates generally a housing of a hazardous gas mixing apparatus defining a chamber 2 receiving a flow of hazardous gas via an inlet conduit 3.

The housing 1 comprises a pair of sidewalls at 4, a top wall 5 and a bottom wall 6. An upright end portion 2A of the chamber is also defined by housing sidewalls 4, an end wall 7, an intermediate wall 8 and a top wall 9. An outlet duct is at 10. Housing 1 is preferably of stainless steel construction to handle a range of hazardous gases entering via inlet conduit 3.

An air inlet assembly generally at 12 is located in a front end wall 13 of the housing to receive ambient air for subsequent mixing with hazardous gas entering via inlet conduit 3 having a curved end portion 3A. terminating internally of chamber 2 in an outlet end 3B.

Air inlet assembly 12 affixed in place on a front end wall 13 of the apparatus carries a perforate member 18 on one end of a housing 17 with a mounting flange at 20. The housing is of box shape in section with top and bottom walls 21–22 and side walls 23. Occupying a segment of the length of the duct is an air straightener 24 suitably secured to the housing interior. A honeycomb structure has proved to be a suitable air straightener for air entering via perforate member 18.

Offset downstream from straightener 24 is an air flow sensor assembly generally at 26 mounted on a housing side wall 23 by fasteners 25. A tubular component 27 of the sensor has a first series of ports 28 (FIG. 3) sensing low pressure occurring on the downstream side of a tube 27. A second series of ports at 30 (FIG. 3) sense high pressure in the housing on the upstream or air flow impact side of the tube assembly. As shown typically in FIG. 3, high pressure ports 30 are in communication with an annular space 32 interior of outer tube 30 while the low pressure ports at 28 are in communication with the interior of an inner tube 31 with the tubes being substantially coextensive. A suitable flow sensor is that sensor assembly sold by Dwyer Instruments, Inc., Series DS-300.

Tubular conduits at 33 and 34 communicate respectively with annular space 32 in tube 27 and the interior of tube 31 with a differential pressure transmitter 35 which provides an analog signal to a signal converter 36 to provide a digital input to a programmable logic controller termed a PLC at 37 which includes a program to calculate and display at 38 the flow rate in FPM of ambient air moving through apparatus mixing chamber 2.

Located downstream from flow sensor assembly 26 is a diffuser 40 with inclined vanes 40 to apportion the air flow leaving housing 17 for travel along courses or vectors inclined to projected axis A (FIG. 2) of housing 17, precluding formation of gas pockets from gas discharged from outlet 3B of conduit 3. The diffuser includes a mounting flange 20 held in place on housing end wall 13 by appropriate fasteners at 41. An end wall inlet opening is at 19.

To achieve desired air flow velocity through mixing chamber 2 to render inert the specific hazardous gas being treated, a damper at 43 is provided to regulate the mixed air and gas flow through an exhaust duct 44 from chamber 2A as induced by the intake side of a blower 45. A damper motor at 46 is in circuit with damper controls (not shown). A gas/air temperature sensor is at 47.

Baffles (not shown) in mixing chamber 2, and end portion 2A thereof, of the type shown and described in U.S. Pat. No. 5,662,722, incorporated herein by reference, contribute to mixing of air with the hazardous gas being treated and also serve to collect deposited particulate from the mixed flow.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An air inlet assembly for admitting an air flow into a hazardous gas mixing apparatus having an air inlet opening and comprising, a housing for communication with air inlet opening of the apparatus, an air flow assembly including an inner tube and an outer tube in place in said housing for simultaneous communication with different air pressures occuring in said housing, an air flow straightening means in said housing and located upstream in the air flow from said air flow sensor assembly, and means in communication with said air flow sensor assembly for providing a display correlated to air flow velocity in the mixing apparatus, a diffuser in said housing downstream from said air flow sensor assembly and adjacent an end of said housing and diverting portions of the air flow through said air inlet opening of the mixing apparatus and along paths inclined to a projected axis of said housing.

2. The assembly claimed in claim 1 wherein said housing includes a perforate air intake.

3. The assembly claimed in claim 1 wherein said air flow straightening means is of honeycomb configuration.

4. The assembly claimed in claim 1 wherein said air flow sensor assembly includes a probe having both high and low pressure ports.

5. In combination, an air inlet assembly, an apparatus having walls defining a mixing chamber for mixing of an air flow with a hazardous gas, said walls terminating at their corresponding ends in securement to an end wall, said end wall of the apparatus defining an air inlet opening, said air inlet assembly comprising, a housing in place on said end wall and defining a passageway for an air flow entering the apparatus through said air inlet opening, air flow straightening means partially occupying said housing and through which the air flow passes, an air flow sensor assembly in said passageway and offset from said air flow straightening means in the direction of the air flow and sensing differential pressures occurring in said housing, means in communication with the air flow sensor assembly and converting air pressures into output signals, a programmable logic controller responsive to the signals and including a display indicating a flow rate of air through said mixing chamber of said apparatus occurring prior to air flow mixing with the hazardous gas, and a diffuser in said housing downstream from said air flow sensor assembly and adjacent an end of said housing and diverting portions of an air flow through said air inlet opening of the mixing apparatus and along paths inclined to the projected axis of said housing.

* * * * *